United States Patent
Nakada

(10) Patent No.: US 10,671,861 B2
(45) Date of Patent: Jun. 2, 2020

(54) IMAGE RECORDING SYSTEM, IMAGE RECORDING METHOD AND IMAGE RECORDING PROGRAM

(71) Applicant: TOYOTA JIDOSHA KABUSHIKI KAISHA, Toyota-shi, Aichi-ken (JP)

(72) Inventor: Hiroshi Nakada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 245 days.

(21) Appl. No.: 15/913,318

(22) Filed: Mar. 6, 2018

(65) Prior Publication Data

US 2018/0268227 A1    Sep. 20, 2018

(30) Foreign Application Priority Data

Mar. 14, 2017   (JP) ................ 2017-049003

(51) Int. Cl.
| | |
|---|---|
| *G06K 9/00* | (2006.01) |
| *G06T 3/40* | (2006.01) |
| *H04N 5/77* | (2006.01) |
| *H04N 9/82* | (2006.01) |
| *G08G 1/16* | (2006.01) |

(52) U.S. Cl.
CPC ..... *G06K 9/00805* (2013.01); *G06K 9/00993* (2013.01); *G06T 3/40* (2013.01); *G06T 3/4023* (2013.01); *H04N 5/77* (2013.01); *H04N 5/772* (2013.01); *H04N 9/8205* (2013.01); *G08G 1/16* (2013.01); *G08G 1/166* (2013.01)

(58) Field of Classification Search
CPC .. G06K 9/00805; G06K 9/00993; G06T 3/40; G06T 3/4023; H04N 9/8205; H04N 5/91; H04N 5/76; H04N 5/77; H04N 5/772; G08G 1/166; G08G 1/16
See application file for complete search history.

(56) References Cited

U.S. PATENT DOCUMENTS

| | | | |
|---|---|---|---|
| 2006/0031015 A1* | 2/2006 | Paradie ............. | G06K 9/00805 701/301 |
| 2007/0003162 A1* | 1/2007 | Miyoshi ............ | G06T 15/20 382/276 |
| 2009/0322502 A1* | 12/2009 | Ozaki ............... | G08G 1/166 340/435 |
| 2015/0062141 A1* | 3/2015 | Hayasaka ......... | B60R 1/00 345/581 |
| 2017/0054946 A1* | 2/2017 | Lee .................... | B60R 1/00 |
| 2017/0144599 A1* | 5/2017 | Lee .................... | H04N 5/2628 |
| 2018/0270444 A1* | 9/2018 | Nakada .............. | H04N 9/8205 |

FOREIGN PATENT DOCUMENTS

| | | |
|---|---|---|
| JP | 107237521 A | 9/1995 |
| JP | H09301122 A | 11/1997 |
| JP | 2010-124474 A | 6/2010 |
| JP | 2010-134745 A | 6/2010 |

* cited by examiner

*Primary Examiner* — Carol Wang
(74) *Attorney, Agent, or Firm* — Hunton Andrews Kurth LLP

(57) ABSTRACT

An image recording system includes: a memory in which an image picked up by a camera and an index value are stored in association with each other, the camera being equipped in a vehicle, the index value indicating a possibility of collision between the vehicle and an obstacle at a time when the image is picked up; and at least one processing circuit configured to perform a quality changing process of decreasing a quality of the image, based on the index value.

15 Claims, 11 Drawing Sheets

FIG. 3

| EVENT ID | RECORDING AREA | IMAGE DATA | TIME STAMP | TTC | ATTRIBUTE OF OBSTACLE |
|---|---|---|---|---|---|
| 000001 | RECORDING AREA B1 | FRAME 1 | ** | ** | VEHICLE |
| | | FRAME 2 | ** | ** | |
| | | FRAME 3 | ** | ** | |
| | | FRAME 4 | ** | ** | |
| | | ... | ** | ... | |
| | | FRAME N | ** | ** | |
| 000002 | RECORDING AREA B2 | FRAME 1 | ** | ** | N/A |
| | | FRAME 2 | ** | ** | |
| | | FRAME 3 | ** | ** | |
| | | FRAME 4 | ** | ** | |
| | | ... | ** | ... | |
| | | FRAME N | ** | ** | |
| ... | ... | ... | ... | ... | ... |

FIG. 4

| PICKUP-TIME TTC | OUTPUT RESOLUTION |
|---|---|
| PICKUP-TIME TTC $\geq \alpha 1$ | LOW |
| $\alpha 1 >$ PICKUP-TIME TTC $\geq \alpha 2$ | MIDDLE |
| $\alpha 2 >$ PICKUP-TIME TTC $\geq \alpha 3$ | HIGH |

FIG. 5

| ATTRIBUTE OF OBSTACLE | PICKUP-TIME TTC | OUTPUT RESOLUTION |
|---|---|---|
| VEHICLE | PICKUP-TIME TTC ≥ $\alpha 1$ | LOW |
| | $\alpha 1$ > PICKUP-TIME TTC ≥ $\alpha 2$ | MIDDLE |
| | $\alpha 2$ > PICKUP-TIME TTC ≥ $\alpha 3$ | HIGH |
| BICYCLE | PICKUP-TIME TTC ≥ $\beta 1$ | LOW |
| | $\beta 1$ > PICKUP-TIME TTC ≥ $\beta 2$ | MIDDLE |
| | $\beta 2$ > PICKUP-TIME TTC ≥ $\beta 3$ | HIGH |
| PEDESTRIAN | PICKUP-TIME TTC ≥ $\gamma 1$ | LOW |
| | $\gamma 1$ > PICKUP-TIME TTC ≥ $\gamma 2$ | MIDDLE |
| | $\gamma 2$ > PICKUP-TIME TTC ≥ $\gamma 3$ | HIGH |

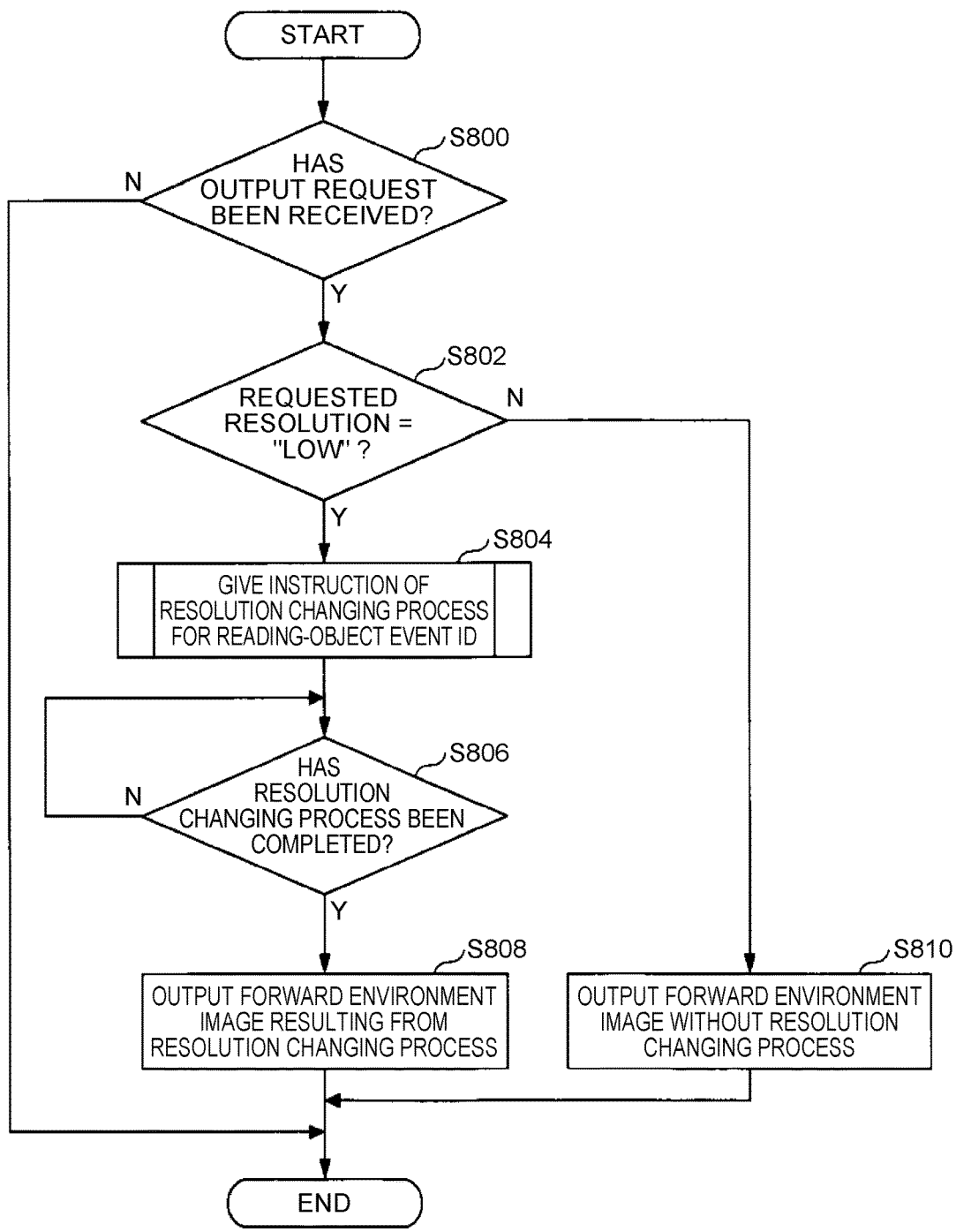

IMAGE RECORDING SYSTEM, IMAGE RECORDING METHOD AND IMAGE RECORDING PROGRAM

INCORPORATION BY REFERENCE

The disclosure of Japanese Patent Application No. 2017-049003 filed on Mar. 14, 2017 including the specification, drawings and abstract is incorporated herein by reference in its entirety.

BACKGROUND

1. Technical Field

The disclosure relates to an image recording system, an image recording method executed by a computer and a storage medium recording an image recording program executed by a computer.

2. Description of Related Art

There is known a technology in which signals of an image photographed by an image pickup device are processed by a signal processing device, and thereafter, a feature of the photographed image is extracted by an image processing device and is sent to a computer together with a picture signal, to be recorded in a storage device (see Japanese Patent Application Publication No. 2010-124474, for example).

SUMMARY

Incidentally, the reading of the image data stored in an image storage unit of a vehicle to the exterior can be realized through a vehicle network such as a CAN (Controller Area Network), for example. However, in some cases, communication speed is relatively low, and the reading of the image data to the exterior requires a relatively long time.

Some aspects of the disclosure provide an image recording system, an image recording method and an image recording program that make it possible to read an image picked up by a camera equipped in a vehicle to the exterior at a relatively high speed.

A first aspect of the disclosure provides an image recording system. The image recording system according to the first aspect includes: a memory in which an image picked up by a camera and an index value are stored in association with each other, the camera being equipped in a vehicle, the index value indicating a possibility of collision between the vehicle and an obstacle at a time when the image is picked up; and at least one processing circuit configured to perform a quality changing process of decreasing a quality of the image, based on the index value.

According to the above aspect, by performing the quality changing process, it is possible to reduce the data amount of the image picked up by the camera equipped in the vehicle, and to read the image to the exterior at a relatively high speed. Further, based on the index value indicating the possibility of the collision between the vehicle and the obstacle at the time when the image is picked up, it is possible to realize an efficient quality changing process in consideration of the importance of the image.

A second aspect of the disclosure provides an image recording method executed by a computer. The image recording method includes: storing an image picked up by a camera and an index value in a memory in association with each other, the camera being equipped in a vehicle, the index value indicating a possibility of collision between the vehicle and an obstacle at a time when the image is picked up; and decreasing a quality of the image based on the index value, the quality of the image being a quality at a time when the image is output to an external device or a display device.

A third aspect of the disclosure provides a storage medium recording an image recording program executed by a computer. When the image recording program is executed by the computer, the image recording program cause the computer to perform a method including: storing an image picked up by a camera and an index value in a memory in association with each other, the camera being equipped in a vehicle, the index value indicating a possibility of collision between the vehicle and an obstacle at a time when the image is picked up; and decreasing a quality of the image based on the index value, the quality of the image being a quality at a time when the image is output to an external device or a display device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing exemplary data in an image storage unit;

FIG. 4 is a diagram showing exemplary TTC-specific resolution information;

FIG. 5 is a diagram showing exemplary obstacle attribute-specific resolution information;

FIG. 8 is a flowchart showing an exemplary image output process by an image output processing unit;

FIG. 9 is an explanatory diagram of an output request;

DETAILED DESCRIPTION OF EMBODIMENTS

Hereinafter, embodiments will be described in detail with reference to the accompanying drawings.

Embodiment 1

In an embodiment 1, an image recording system includes a processing device 7.

Figure 1:
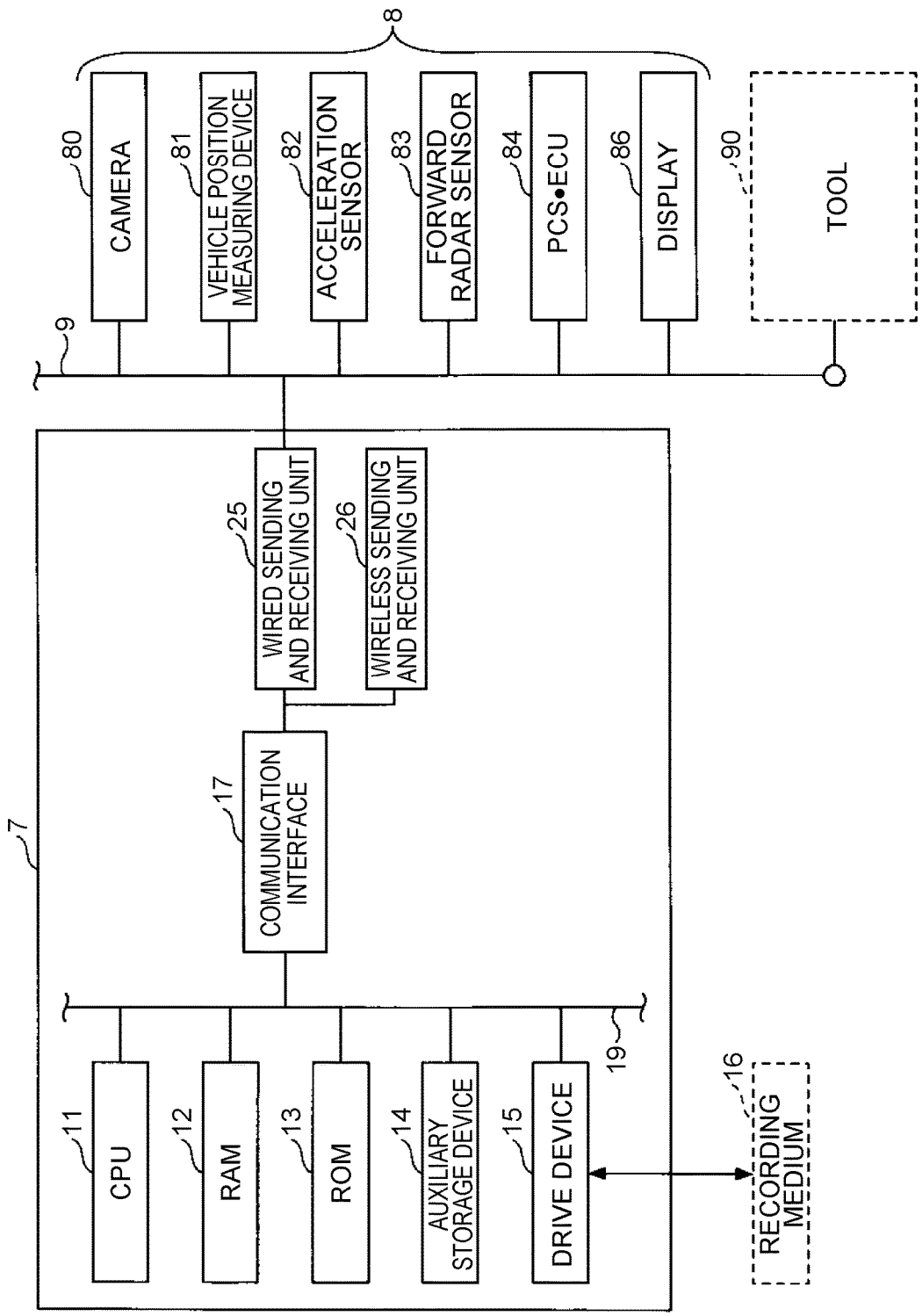
FIG. 1 is a diagram showing an exemplary hardware configuration of an image recording system (processing device) in an embodiment 1.

FIG. 1 is a diagram showing an exemplary hardware configuration of the processing device 7 in the embodiment 1. In FIG. 1, an in-vehicle electronic device group 8 is schematically illustrated in association with the hardware configuration of the processing device 7. The processing device 7 is connected to the in-vehicle electronic device group 8, through a vehicle network 9 such as CAN (Controller Area Network), LIN (Local Interconnect Network) and Ethernet®, for example.

The processing device 7 includes a CPU (Central Processing Unit) 11, a RAM (Random Access Memory) 12, a ROM (Read Only Memory) 13, an auxiliary storage device 14, a drive device 15, and a communication interface 17, which are connected through a bus 19. Further, the processing device 7 includes a wired sending and receiving unit 25 and a wireless sending and receiving unit 26, which are connected to the communication interface 17. The wireless sending and receiving unit 26 may be excluded.

For example, the auxiliary storage device 14 is an EEPROM (Electrically Erasable Programmable Read-Only Memory), an HDD (Hard Disk Drive), or the like.

The wired sending and receiving unit 25 includes a sending and receiving unit that can perform communication using the vehicle network such as CAN (Controller Area Network) and LIN (Local Interconnect Network). The wireless sending and receiving unit 26 is a sending and receiving unit that can perform wireless communication using a wireless communication network for mobile phones. The processing device 7 may include a second wireless sending and receiving unit (not illustrated) that is connected to the communication interface 17, in addition to the wired sending and receiving unit 25. In this case, the second wireless sending and receiving unit may include a near field communication (NFC) unit, a Bluetooth® communication unit, a Wi-Fi (Wireless-Fidelity) sending and receiving unit, an infrared sending and receiving unit, and the like. The processing device 7 may be connectable to a recording medium 16. The recording medium 16 stores a predetermined program. The program stored in the recording medium 16 is installed, for example, in the auxiliary storage device 14 of the processing device 7 through the drive device 15. After the installation, the predetermined program can be executed by the CPU 11 of the processing device 7.

The in-vehicle electronic device group 8 includes a camera 80, a vehicle position measuring device 81, an acceleration sensor 82, a forward radar sensor 83, a PCS (Pre-Crash Safety) ECU (Electronic Control Unit) 84, a display 86 and the like.

The camera 80 picks up a forward sight from the vehicle (an example of environment around the vehicle). Hereinafter, the image picked up by the camera 80 is referred to as a "forward environment image I" also. The camera 80 may be a camera that picks up a lateral sight from the vehicle, a camera that picks up a rearward sight from the vehicle, a camera that picks up a sight in the vehicle, or the like.

The vehicle position measuring device 81 measures the position of its own vehicle, based on electric waves from GNSS (Global Navigation Satellite System) satellites. The acceleration sensor 82 detects the acceleration applied to a vehicle body. The acceleration sensor 82, for example, detects acceleration components on three axes.

The forward radar sensor 83 detects the situation of a forward obstacle (typically, a forward vehicle) in front of the vehicle (hereinafter, referred to as merely an "obstacle"), using an electric wave (for example, a millimeter wave), a light wave (for example, a laser) or an ultrasonic wave as a detection wave. The forward radar sensor 83, in a predetermined cycle, detects information indicating relations between the obstacle and its own vehicle, for example, the relative speed, distance and lateral position of the obstacle with respect to its own vehicle. The obstacle information detected by the forward radar sensor 83 in this way is sent to the PCS ECU 84, in a predetermined cycle, for example.

The PCS ECU 84 determines whether an automatic braking start condition is satisfied, based on the information from the forward radar sensor 83. The automatic braking start condition is satisfied when there is a possibility of the collision with the obstacle in front of its own vehicle. The PCS ECU 84 performs an automatic braking control of automatically braking its own vehicle, when the automatic braking start condition is satisfied. For example, in a collision avoidance control with the obstacle, the PCS ECU 84 calculates TTC (Time to Collision), which is a time to the collision with the obstacle, and determines that the automatic braking start condition is satisfied, when the calculated TTC is below a predetermined threshold Th1 (for example, 1.0 [second]). For example, TTC is derived by dividing the distance to the obstacle by the relative speed to the obstacle. The predetermined threshold Th1 may vary depending on the attribute of the obstacle. For example, in the case where the attribute of the obstacle is "pedestrian", the predetermined threshold Th1 is 1.0 [second]. In the case where the attribute of the obstacle is "bicycle", the predetermined threshold Th1 is 0.7 [seconds]. In the case where the attribute of the obstacle is "vehicle", the predetermined threshold Th1 is 0.5 [seconds].

The automatic braking control is a control of automatically giving braking force to its own vehicle. For example, the automatic braking control is realized by increasing the pressure of a wheel cylinder of each wheel by a brake actuator (an element of the in-vehicle electronic device group 8, not illustrated), in a situation where a driver is not operating a brake pedal. A target control value during execution of the automatic braking control is a value that is determined based on a factor other than the operation amount of the brake pedal.

The PCS ECU 84 may determine whether the automatic braking start condition is satisfied, using the camera 80, instead of or in addition to the forward radar sensor 12. In this case, the camera 80 may be a stereo camera. The PCS ECU 84 includes an image processing device, for example, and recognizes the situation of the obstacle and the attribute of the obstacle as an image. The attribute of the obstacle indicates a type such as vehicle, bicycle and pedestrian, for example. The attribute of the obstacle can be determined using an attribute recognition engine based on pattern matching or machine learning. Based on the image recognition result, the PCS ECU 84 can detect the information indicating relations between the obstacle and its own vehicle, for example, the relative speed, distance and lateral position of the obstacle with respect to its own vehicle, in a predetermined cycle. Image processing functions (for example, a function to calculate the position of the obstacle) may be realized by an image processing device that is connected to the PCS ECU 84.

The display 86 is a touch-panel liquid crystal display, for example. The display 86 is disposed at a position allowing an occupant of the vehicle to see the display 86. The display 86 is a display that is fixed to the vehicle, but may be a display of a mobile terminal that can be carried in the vehicle. In this case, the communication between the mobile terminal and the processing device 7 can be realized through the second wireless sending and receiving unit (for example, the Bluetooth communication unit).

The processing device 7 can be connected with a tool 90 (an exemplary external device) through the vehicle network 9.

The tool 90 is an external device that is used for giving an output request of the forward environment image I to the processing device 7 described later. However, the tool 90 may be a general-purpose tool allowing other use applications. The tool 90 includes a special tool that is prepared for a dealer or the like authorized by a vehicle manufacturer, and in addition, may be a tool that can be used by general users. The tool that can be used by general users may be a smartphone or a tablet terminal. The tool 90, ordinarily, is not connected to the vehicle network 9. The tool 90 is connected to the vehicle network 9 for giving the output request to the processing device 7 described later, at the time of the reading of the forward environment image I (the image picked up by the camera 80) in an image storing processing unit 724 described later.

Figure 2:
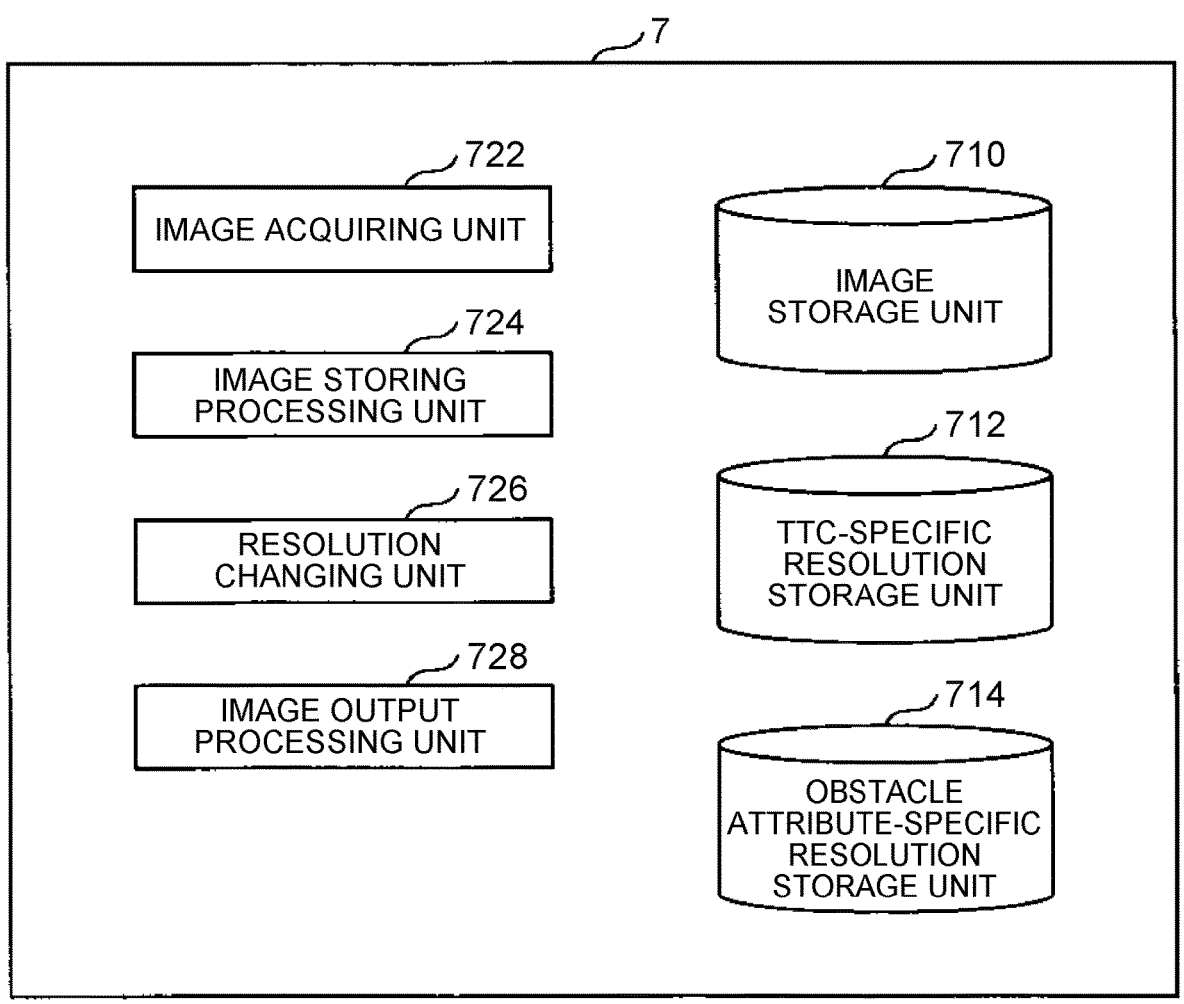
FIG. 2 is a diagram showing an exemplary functional block of the processing device in the embodiment 1.

FIG. 2 is a diagram showing an exemplary functional block of the processing device 7.

The processing device 7 performs a quality changing process of decreasing the quality of the forward environment image I, based on TTC (an exemplary index value indicating the possibility of the collision between the vehicle and the obstacle) at the time when the forward environment image I is picked up (hereinafter, referred to as "pickup-time TTC"). The quality of the forward environment image I is a quality that influences the data amount of the image, and the index value for the quality includes the resolution of the image and the color number of the image (the number of colors that can be exhibited by each pixel). The resolution is defined as the pixel number per inch (dpi: pixel per inch), for example, but may be defined by an index value of a relation of pixel numbers such as vertical and horizontal pixel numbers, as exemplified by 640×480, 1280×960, Full HD (Full High Definition) and 4K. The quality changing process of decreasing the vertical and horizontal pixel numbers may be a simple shrinking process. Furthermore, the color number is the number of colors that are expressed, as exemplified by monochrome, 8-bit color and 24-bit color. The color number may be defined, for example, by color depth (bits per pixel (bpp)), which is an index value. The quality changing process of decreasing the color number may be a simple process. The quality changing process may be realized by an irreversible compression process. This is because the irreversible compression process deteriorates the image, and for example, decreases the visibility (clearness and the like) of the image.

For example, the quality changing process includes a process of decreasing both of the resolution and color number of the forward environment image I and a process of decreasing only one of them. Further specific examples of the resolution changing process will be described later. Hereinafter, as an example, it is assumed that the quality changing process is the process of decreasing the resolution of the forward environment image I (the same goes for an embodiment 2 described later). When the quality changing process is the process of decreasing the color number or when the quality changing process includes the process of decreasing the color number, the color number may be set in the same manner as an output resolution described later (based on the same concept). This is because the increase in the color number increases the data amount of the image similarly to the increase in the resolution and the color number can be treated in a manner similar to the resolution.

The processing device 7 includes an image storage unit 710, a TTC-specific resolution storage unit 712, and an obstacle attribute-specific resolution storage unit 714. The image storage unit 710, the TTC-specific resolution storage unit 712 and the obstacle attribute-specific resolution storage unit 714 can be realized by the auxiliary storage device 14. Further, the processing device 7 includes an image acquiring unit 722, the image storing processing unit 724, a resolution changing unit 726 (an exemplary quality changing unit), and an image output processing unit 728. The image acquiring unit 722, the image storing processing unit 724, the resolution changing unit 726 and the image output processing unit 728 can be realized when the CPU 11 executes one or more programs in the ROM 13 and the auxiliary storage device 14.

The image storage unit 710 stores the forward environment image I. In the embodiment 1, as an example, the forward environment image I is stored in a recording area of the image storage unit 710, in association with an event ID. The event ID is an ID (Identification) to be provided to an event (described later) that triggers an image storing process of recording the forward environment image I in the recording area. FIG. 3 is a diagram showing exemplary data in the image storage unit 710. In FIG. 3, "" shows that some kind of information is contained. In the example shown in FIG. 3, the image storage unit 710 includes a plurality of recording areas (recording areas B1, B2 in FIG. 3, and others), and in each recording area, the image data of the forward environment image I (for example, see image data of a forward environment image I having frames 1 to N that are stored in a "recording area B1") is stored. The image data of the forward environment image I is stored in association with time stamp and pickup-time TTC. The time stamp is generated based on the value of a time stamp counter that is incremented for each clock of the CPU 11. For example, the time stamp indicates an elapsed time after an ignition switch is turned on. The pickup-time TTC can be acquired based on TTC that is acquired from the PCS ECU 84. When the PCS ECU 84 recognizes the attribute of the obstacle, the attribute of the obstacle is stored in association with the event ID. The attribute of the obstacle, similarly, can be acquired from the PCS ECU 84. In FIG. 3, as for an event ID "000002", the attribute of the obstacle is "N/A", and it is shown that the PCS ECU 84 did not recognize the attribute of the obstacle or could not recognize the attribute of the obstacle. On the other hand, as for an event ID "000001", the attribute of the obstacle is "VEHICLE", and it is shown that the PCS ECU 84** recognized the attribute of the obstacle as "VEHICLE".

In the TTC-specific resolution storage unit 712, TTC-specific resolution information associated with the output resolution for each pickup-time TTC is stored. The output resolution is a resolution at the time when the forward environment image I is read and output. For example, the TTC-specific resolution information is previously prepared, and the output resolution is higher as the pickup-time TTC is smaller. FIG. 4 is a diagram showing an example of the TTC-specific resolution information. In FIG. 4, output resolutions ("LOW", "MIDDLE" and others in FIG. 4) are stored corresponding to ranges (PICKUP-TIME TTC≥α1, α1>PICKUP-TIME TTC≥α2, and others) of the pickup-time TTC. The TTC-specific resolution information may allow a subsequent change. An output resolution of "HIGH" corresponds to the resolution obtained by the camera 80.

In the obstacle attribute-specific resolution storage unit 714, obstacle attribute-specific resolution information associated with the output resolution for each attribute of the obstacle is stored. FIG. 5 is a diagram showing an example of the obstacle attribute-specific resolution information. In FIG. 5, output resolutions ("LOW", "MIDDLE" and others in FIG. 5) are stored corresponding to attributes (VEHICLE, PEDESTRIAN and others) of the obstacle and ranges of the pickup-time TTC. The obstacle attribute-specific resolution information may allow a subsequent change. In FIG. 5, α1 to α3, β1 to β3 and γ1 to γ3 are boundary values that specify ranges of the pickup-time TTC, and may be different depending on the attribute of the obstacle. For example, α3, β3 and γ3 are "zero". Further, α1 to α3, β1 to β3 and γ1 to γ3 may allow a change by a user.

In the embodiment, as an example, the obstacle attribute-specific resolution information includes the TTC-specific resolution information for each attribute of the obstacle, as shown in FIG. 5. As a modification, the obstacle attribute-specific resolution information shown in FIG. 5 may include the TTC-specific resolution information shown in FIG. 4. In this case, when the attribute of the obstacle is "unknown", the TTC-specific resolution information may be prepared for each attribute of the obstacle, such that the TTC-specific resolution information shown in FIG. 4 is used. In FIG. 4 and FIG. 5, as an example, α1 to α3 are common. However, α1 to α3 in FIG. 4 and α1 to α3 in FIG. 5 may be different from each other.

The image acquiring unit 722 acquires the forward environment image I from the camera 80. The image acquiring unit 722 acquires the forward environment image I from the camera 80 with a predetermined frame period. The image acquiring unit 722 saves the acquired forward environment image I in the image storage unit 710, for example, in a FIFO (First-In, First-Out) fashion. For example, the image acquiring unit 722 writes forward environment images I in a recording period T1, into a ring buffer (not illustrated), in a FIFO fashion.

When a predetermined event is detected, the image storing processing unit 724 records (transfers) the image data (the image data including forward environment images I at a plurality of time points in the recording period T1) stored in the ring buffer, in a predetermined recording area of the image storage unit 710.

The resolution changing unit 726 performs the resolution changing process of decreasing the resolution of the forward environment image I. For example, the resolution changing process may be realized by a process of decimating pixels, or a process (a so-called pyramid process) of averaging four pixels to one pixel. For example, the pyramid process may be realized by forming a Gaussian pyramid as an image pyramid. In the embodiment 1, the resolution changing unit 726 performs the resolution changing process, when the forward environment image I is read from the image storage unit 710 in response to the output request that is externally input through the tool 90. The resolution changing process is a process of changing the resolution of the whole of the forward environment image I, but may be a process of changing the resolution of a part of the forward environment image I.

The resolution changing unit 726 decreases the resolution of the forward environment image I, based on the pickup-time TTC. Specifically, for a certain forward environment image I, the resolution changing unit 726 changes the resolution of the certain forward environment image I to the output resolution associated with the pickup-time TTC for the certain forward environment image I, based on the pickup-time TTC for the certain forward environment image I and the TTC-specific resolution information (FIG. 4) in the TTC-specific resolution storage unit 712.

In the case where the PCS ECU 84 has recognized the attribute of the obstacle (that is, in the case where the attribute of the obstacle has been associated with a reading-object event ID described later in the image storage unit 710), the resolution changing unit 726 decreases the resolution of the forward environment image I based on the pickup-time TTC and the attribute of the obstacle, using the obstacle attribute-specific resolution information (FIG. 5) in the obstacle attribute-specific resolution storage unit 714. Specifically, for a certain forward environment image I corresponding to a reading-object event ID (described later), the resolution changing unit 726 changes the resolution of the certain forward environment image I to the output resolution associated with the pickup-time TTC for the certain forward environment image I and the attribute of the obstacle, based on the pickup-time TTC for the certain forward environment image I, the attribute of the obstacle associated with the reading-object event ID and the TTC-specific resolution information in the TTC-specific resolution storage unit 712.

The image output processing unit 728 outputs the forward environment image I in the image storage unit 710, after receiving the output request of the forward environment image I. In the embodiment 1, as an example, the output request is input through the tool 90. The image output processing unit 728 outputs the forward environment image I resulting from the resolution changing process by the resolution changing unit 726, to the tool 90.

According to the embodiment 1, because of including the resolution changing unit 726, it is possible to change the resolution of the forward environment image I. That is, according to the embodiment 1, the resolution changing unit 726 performs the resolution changing process at the time when the forward environment image I is read from the image storage unit 710, and thereby, the image output processing unit 728 can output the forward environment image I resulting from the resolution changing process, to the tool 90. In the forward environment image I resulting from the resolution changing process, when the resolution is decreased due to the resolution changing process, the data amount is reduced by the resolution changing process. Accordingly, when the resolution changing unit 726 performs the resolution changing process, it is possible to read the forward environment image I from the image storage unit 710 at a higher speed than when the resolution changing unit 726 does not perform the resolution changing process.

In the above-described embodiment 1, the output request of the forward environment image I is input through the tool 90, and the forward environment image I read from the image storage unit 710 is output to the tool 90. However, the disclosure is not limited to this. For example, the output request of the forward environment image I may be input through the tool 90, and the forward environment image I read from the image storage unit 710 may be output to an external device (for example, a server) other than the tool 90. In this case, the output to the server can be realized using the wireless sending and receiving unit 26. Further, the output request of the forward environment image I may be input through an external device (for example, a server) other than the tool 90, and the forward environment image I read from the image storage unit 710 may be output to the server that is an output requestor. Alternatively, the output request of the forward environment image I may be input through the tool 90, and the forward environment image I read from the image storage unit 710 may be output (displayed) to the display 86 (an exemplary display device) in the vehicle. Alternatively, the output request of the forward environment image I may be input through a device in the vehicle, and the forward environment image I read from the image storage unit 710 may be output to the display 86 in the vehicle.

In the above-described embodiment 1, when the PCS ECU 84 has no function to recognize the attribute of the obstacle, the obstacle attribute-specific resolution storage unit 714 may be excluded.

Next, with reference to FIG. 6 to FIG. 9, a principal part of an operation example of the image recording system (the processing device 7) in the embodiment 1 will be described with use of flowcharts.

Figure 6:
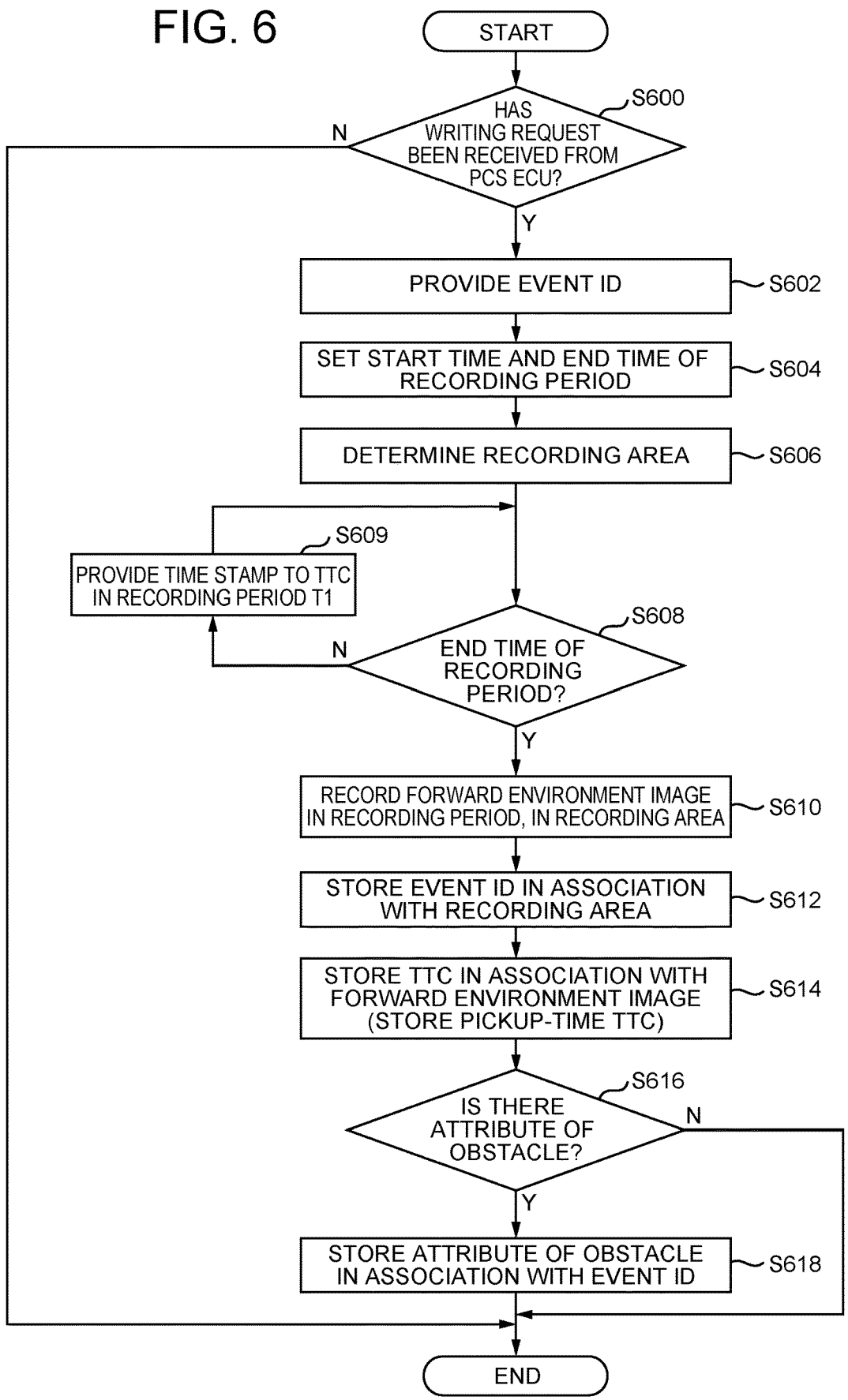
FIG. 6 is a flowchart showing an exemplary image storing process by an image storing processing unit.
Figure 7:
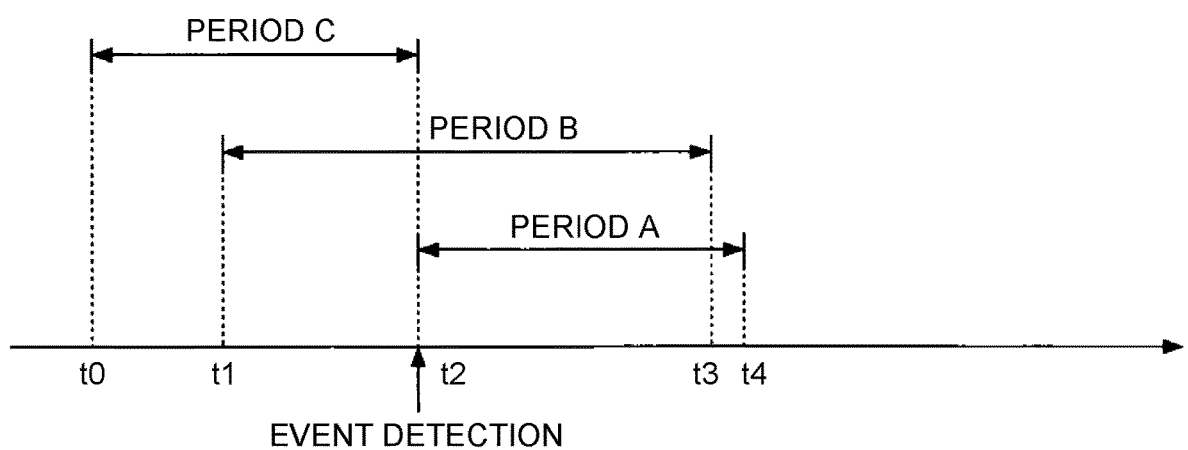
FIG. 7 is an explanatory diagram of a start time and an end time of a recording period.

FIG. 6 is a flowchart showing an exemplary image storing process by the image storing processing unit 724. For example, the process shown in FIG. 6 is executed in a predetermined cycle, when the ignition switch is in an on-state.

In step S600, the image storing processing unit 724 determines whether a writing request has been received from the PCS ECU 84. In the case where the PCS ECU 84 has detected a predetermined event (hereinafter, referred to as an "event") in which TTC becomes equal to or less than a predetermined threshold Th2, the PCS ECU 84 sends the writing request to the vehicle network 9. In the case where the PCS ECU 84 has recognized the attribute of the obstacle, information allowing the attribute of the obstacle to be specified is added in the writing request. In this case, the image storing processing unit 724 can detect the attribute of the obstacle in the detected event, based on the writing request from the PCS ECU 84. In the case where the predetermined threshold Th2 is more than the predetermined threshold Th1, the event occurs before the satisfaction of the automatic braking start condition. If the determination result is "YES", the process proceeds to step S602. Otherwise, the process in this cycle ends.

In step S602, the image storing processing unit 724 provides an event ID to the detected event.

In step S604, the image storing processing unit 724 sets a start time and end time of the recording period T1, depending on the attribute of the detected event. For example, as shows in FIG. 7, the recording period T1 is a period A (t2 to t4) that starts at an event detection time t2, a period C (t0 to t2) that ends at the event detection time t2, or a period B (t1 to t3) that includes before and after the event detection time t2. In the case of an event before collision, the period A is used, for example, but the disclosure is not limited to this.

In step S606, the image storing processing unit 724 determines a recording area (a recording area in the image storage unit 710) that is a recording destination of the image data about the detected event. If there is an available space, the available space is used as the recording area. Here, the number of recording areas is limited (see FIG. 3). In the case where the image data has been already stored in all recording areas, a recording area in which the oldest image data is recorded may be used, or a priority may be provided corresponding to the event ID, for example.

In step S608, the image storing processing unit 724 determines whether it is the end time of the recording period T1 set in step S604 (that is, whether the current time point is the end time of the recording period T1). If the determination result is "YES", the process proceeds to step S610. Otherwise, after step S609, the processing device 7 becomes a waiting state of waiting for the end time of the recording period T1. Although not illustrated, when the ignition switch is turned off in the waiting state, the process proceeds to step S610, and ends after step S610.

In step S609, to TTC acquired from the PCS ECU 84 in a predetermined cycle during the recording period T1, the image storing processing unit 724 provides a time stamp at that time.

In step S610, the image storing processing unit 724 records (transfers) the forward environment image I in the recording period T1 set in step S604, which is the forward environment image I of the image data stored in the ring buffer, in the recording area (the recording area of the image storage unit 710) determined in step S606.

In step S612, the image storing processing unit 724, in the image storage unit 710, associates the event ID provided in step S602 with the recording area determined in step S606 (see FIG. 3).

In step S614, based on the time stamps provided to the forward environment images I and the time stamps (step S609) provided to the TTCs, the image storing processing unit 724 associates the TTCs with the forward environment images I in the image storage unit 710. Each TTC associated with the forward environment image I in the image storage unit 710 functions as the pickup-time TTC.

In step S616, the image storing processing unit 724 determines whether the writing request acquired in step S600 includes the information allowing the attribute of the obstacle to be specified. If the determination result is "YES", the process proceeds to step S618. Otherwise, the process in this cycle ends.

In step S618, the image storing processing unit 724 stores the attribute of the obstacle in the image storage unit 710, in association with the event ID.

According to the image storing process shown in FIG. 6, when the event occurs, it is possible to store the image data (forward environment images I at a plurality of time points) in the recording period T1, in the image storage unit 710. On this occasion, in the image storage unit 710, forward environment images I are stored in association with the event ID, and pickup-time TTCs are stored in association with the forward environment images I. Further, in the case of an event in which the PCS ECU 84 has recognized the attribute of the obstacle, the attribute of the obstacle is stored in the image storage unit 710, in association with the event ID.

FIG. 8 is a flowchart showing an exemplary image output process by the image output processing unit 728. The image output process shown in FIG. 8 is executed in a predetermined cycle, in a state where the tool 90 is connected to the vehicle network 9.

In step S800, the image output processing unit 728 determines whether the output request has been received from the tool 90. In the embodiment 1, as an example, the output request is sent from the tool 90 to the vehicle network 9, as a sending signal including pieces of information shown in FIG. 9. In FIG. 9, the sending signal includes a sending signal ID, a reading-object event ID and a requested resolution. The sending signal ID is information allowing the image output processing unit 728 to detect that the type of the sending signal is "output request". The reading-object event ID is information allowing the image output processing unit 728 to specify an event ID in the image storage unit 710 for which the output of the image data is requested. The reading-object event ID may be information designating the recording area of the reading object. For example, a user of the tool 90 may designate the reading-object event ID, based on event information included in diagnostic information that can be extracted using the tool 90. The requested resolution is a value of the output resolution that is requested by the user, and in the embodiment 1, has two values of "HIGH" and "LOW", as an example. When the requested resolution is "HIGH", reading speed becomes lower than when the requested resolution is "LOW". Therefore, the user selects the requested value of the output resolution, in consideration of a necessary resolution and a desired reading speed. If the determination result is "YES", the process proceeds to step S802. Otherwise, the process in this cycle ends.

In step S802, the image output processing unit 728 determines whether the requested resolution is "LOW". If the determination result is "YES", the process proceeds to step S804. Otherwise, the process proceeds to step S810.

In step S804, the image output processing unit 728 gives the reading-object event ID acquired in step S800, to the resolution changing unit 726, and makes the resolution changing unit 726 execute the resolution changing process. This resolution changing process will be described later with reference to FIG. 10.

In step S806, the image output processing unit 728 determines whether the resolution changing process by the resolution changing unit 726 has been completed. If the determination result is "YES", the process proceeds to step S808. Otherwise, the processing device 7 becomes a waiting state of waiting for the completion of the resolution changing process by the resolution changing unit 726.

In step S808, the image output processing unit 728 outputs the forward environment image I resulting from the resolution changing process in step S806, to the tool 90.

In step S810, the image output processing unit 728 reads all forward environment images I associated with the event ID about the reading-object event ID, from the image storage unit 710, and outputs the forward environment images I to the tool 90, with no change (that is, without performing the resolution changing process).

According to the process shown in FIG. 8, after receiving the output request from the tool 90, the image output processing unit 728 outputs the forward environment image I with the output resolution corresponding to the requested resolution, to the tool 90. Thereby, it is possible to output the image data for the reading-object event ID at a relatively high speed, to a user who prioritizes the reading speed over the output resolution.

In the example shown in FIG. 8, the image output processing unit 728 determines whether to perform the resolution changing process, depending on the requested resolution in the output request, but the disclosure is not limited to this. The image output processing unit 728 may always execute the resolution changing process. In this case, the requested resolution in the output request is unnecessary. Alternatively, the image output processing unit 728 may determine whether to perform the resolution changing process, based on the attribute of the user who performs the output request, the vehicle position at the time when the output request is received, or the like.

Figure 10:
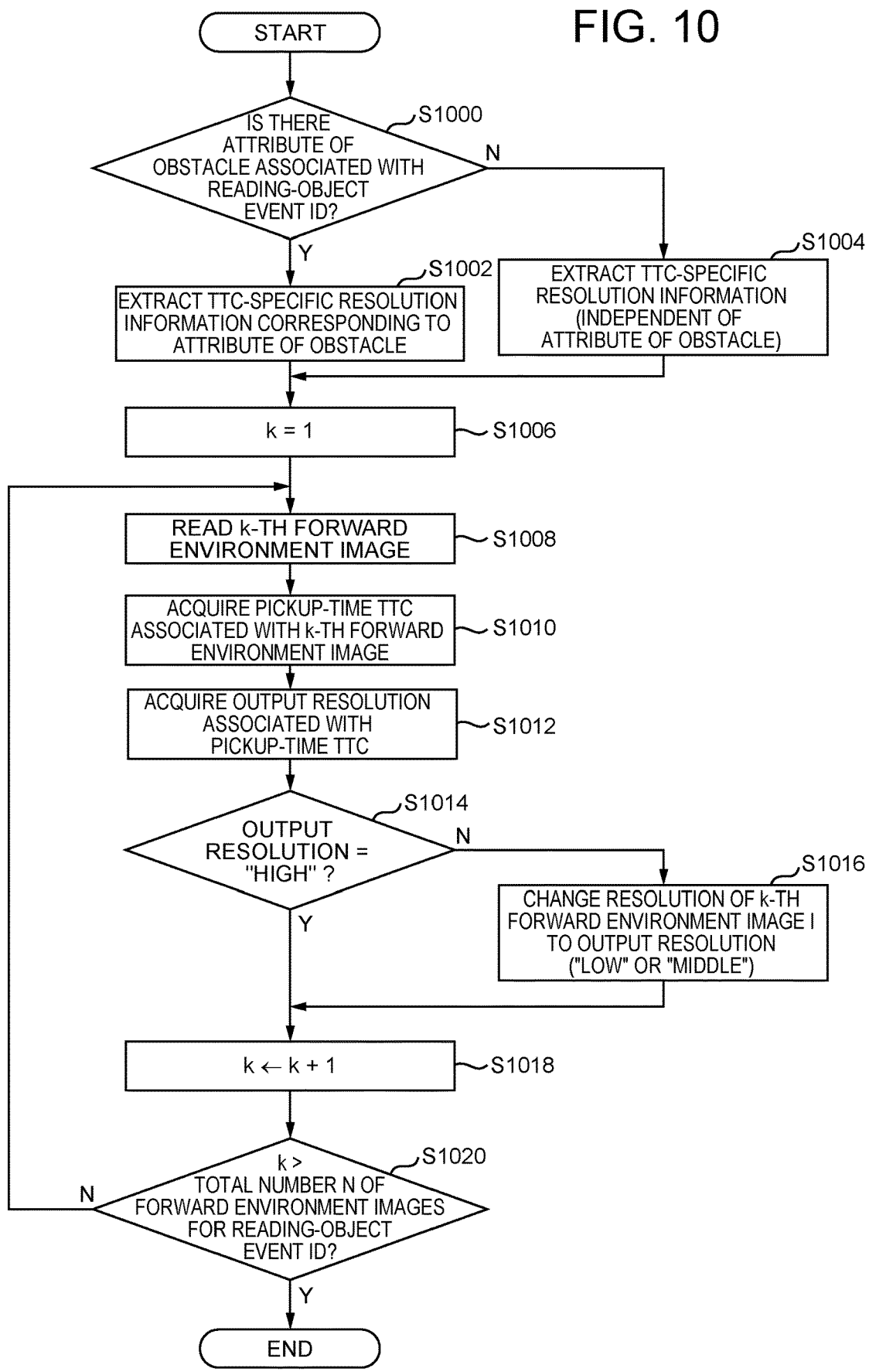
FIG. 10 is a flowchart showing an exemplary resolution changing process in the embodiment 1.

FIG. 10 is a flowchart showing an exemplary resolution changing process by the resolution changing unit 726. The execution of the resolution changing process shown in FIG. 10 is triggered by the input of the reading-object event ID in step S804 of FIG. 8.

In step S1000, the resolution changing unit 726 determines whether the attribute of the obstacle associated with the reading-object event ID is stored in the image storage unit 710 (see FIG. 3). If the determination result is "YES", the process proceeds to step S1002. Otherwise, the process proceeds to step S1004.

In step S1002, the resolution changing unit 726 extracts the TTC-specific resolution information corresponding to the attribute of the obstacle, based on the obstacle attribute-specific resolution information (FIG. 5) in the obstacle attribute-specific resolution storage unit 714.

In step S1004, the resolution changing unit 726 extracts the TTC-specific resolution information (FIG. 4) in the TTC-specific resolution storage unit 712.

After step S1002 and step S1004, the process proceeds to step S1006. In step S1006 and the subsequent steps, the TTC-specific resolution information extracted in step S1002 or step S1004 is used. In the description of step S1006 and the subsequent steps, the TTC-specific resolution information extracted in step S1002 or step S1004 is referred to as merely "TTC-specific resolution information".

In step S1006, the resolution changing unit 726 sets k to 1.

In step S1008, the resolution changing unit 726 reads a k-th forward environment image I of a plurality of forward environment images I associated with the reading-object event ID, from the image storage unit 710. For example, the k-th forward environment image I may be a forward environment image I that is of the plurality of forward environment images I associated with the reading-object event ID and that is picked up for the k-th time in time series.

In step S1010, the resolution changing unit 726 acquires the pickup-time TTC associated with the k-th forward environment image I, based on the data (see FIG. 3) in the TTC-specific resolution storage unit 712.

In step S1012, the resolution changing unit 726 acquires the output resolution ("LOW", "MIDDLE" or "HIGH") associated with the pickup-time TTC acquired in step S1010, based on the pickup-time TTC acquired in step S1010 and the TTC-specific resolution information (FIG. 4 or FIG. 5).

In step S1014, the resolution changing unit 726 determines whether the output resolution acquired in step S1012 is "HIGH". If the determination result is "YES", the process proceeds to step S1018. Otherwise (that is, if the output resolution is "LOW" or "MIDDLE"), the process proceeds to step S1016.

In step S1016, the resolution changing unit 726 changes (decreases) the resolution of the k-th forward environment image I, to the output resolution acquired in step S1012.

In step S1018, the resolution changing unit 726 increments k by "1".

In step S1020, the resolution changing unit 726 determines whether k is more than a total number N of the plurality of forward environment images I associated with the reading-object event ID. If the determination result is "YES", the process ends with no change. Otherwise, the process is continued from step S1008.

According to the process shown in FIG. 10, the resolution changing unit 726 can change (or maintain) the resolution of the forward environment image I depending on the pickup-time TTC, for each forward environment image I, using the TTC-specific resolution information corresponding to the attribute of the obstacle.

Embodiment 2

In the embodiment 2, an image recording system includes a processing device 7A. The embodiment 2 is different from the above-described embodiment 1 in timing of the resolution changing process. In the following, characteristic constituents in the embodiment 2 will be mainly described. In the embodiment 2, identical reference characters are assigned to constituent elements that may be the same as those in the above-described embodiment 1, and descriptions thereof will be omitted, in some cases.

Figure 11:
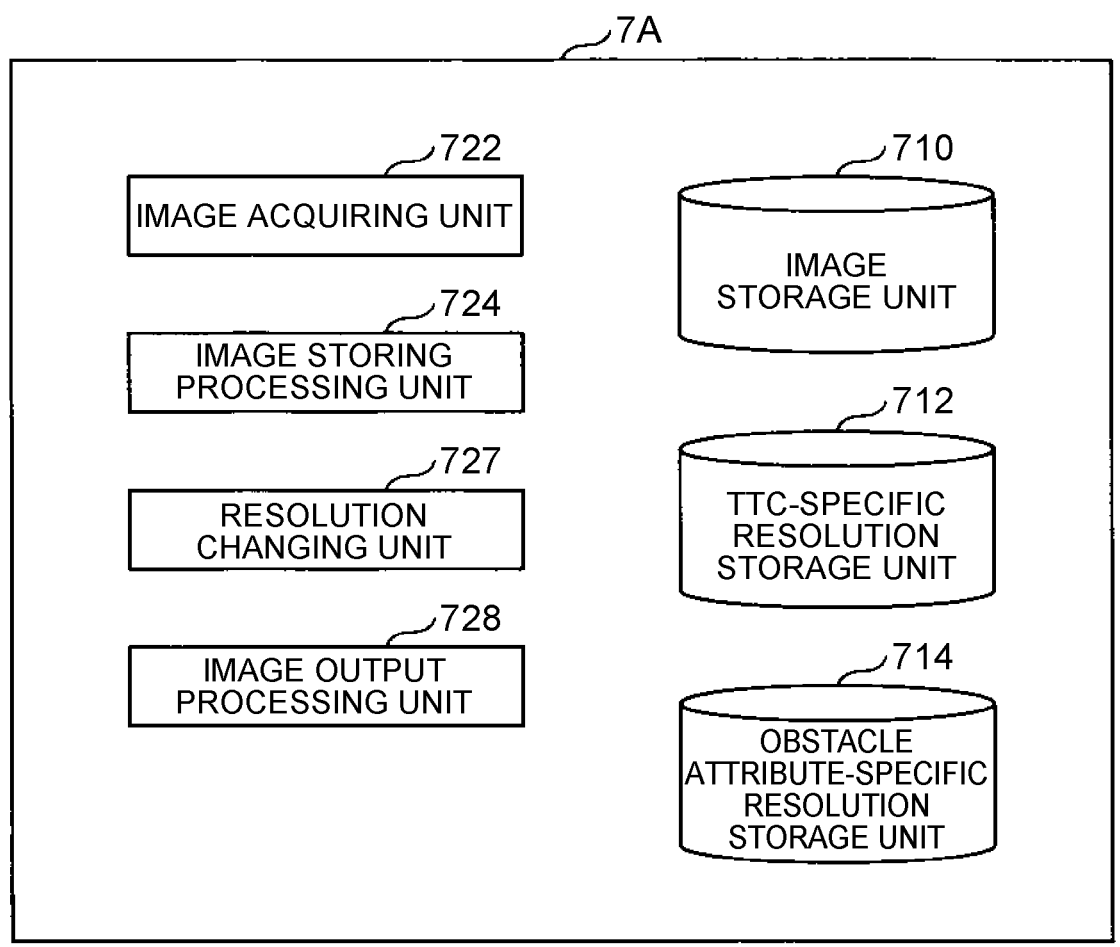
FIG. 11 is a diagram showing an exemplary functional block of an image recording system (processing device) in an embodiment 2.

FIG. 11 is a diagram showing an exemplary functional block of the processing device 7A in the embodiment 2.

The processing device 7A in the embodiment 2 has the same hardware configuration as the processing device 7 in the above-described embodiment 1, but is different in that the image storing processing unit 724, the resolution changing unit 726 and the image output processing unit 728 are replaced with an image storing processing unit 724A, a resolution changing unit 726A (an exemplary quality changing unit) and an image output processing unit 728A, respectively. The image storing processing unit 724A, the resolution changing unit 726A and the image output processing unit 728A can be realized when the CPU 11 executes one or more programs in the ROM 13 and the auxiliary storage device 14.

The image storing processing unit 724A is different from the image storing processing unit 724 in the above-described embodiment 1, in that the forward environment image I is stored in the image storage unit 710 after the resolution changing process by the resolution changing unit 726A. In other words, the resolution changing unit 726A performs the resolution changing process at the time when the forward environment image I is stored in the image storage unit 710. The "time when the forward environment image I is stored in the image storage unit 710" is a concept including a "time just before the forward environment image I is stored in the image storage unit 710" and a "time just after the forward environment image I is stored in the image storage unit 710". The resolution changing process is the same as that in the above-described embodiment 1, except the timing.

The image output processing unit 728A is different from the image output processing unit 728 in the above-described embodiment 1, in that the image I read from the image storage unit 710 is output to the tool 90 with no change (that is, without performing the resolution changing process), in response to the output request from the tool 90.

According to the embodiment 2, it is possible to obtain the same effect as the above-described embodiment 1. That is, according to the embodiment 2, because of including the resolution changing unit 726A, it is possible to read the forward environment image I from the image storage unit 710, at a relatively high speed.

In the embodiment 2, the resolution changing unit 726A performs the resolution changing process at the time when the forward environment image I is stored in the image storage unit 710, but the disclosure is not limited to this. For example, the resolution changing unit 726A may perform the resolution changing process at the time after the forward environment image I is stored in the image storage unit 710 and before the forward environment image I is read from the image storage unit 710 in response to the output request.

Next, with reference to FIG. 12, a principal part of an operation example of the image recording system (the processing device 7A) in the embodiment 2 will be described with use of a flowchart.

Figure 12:
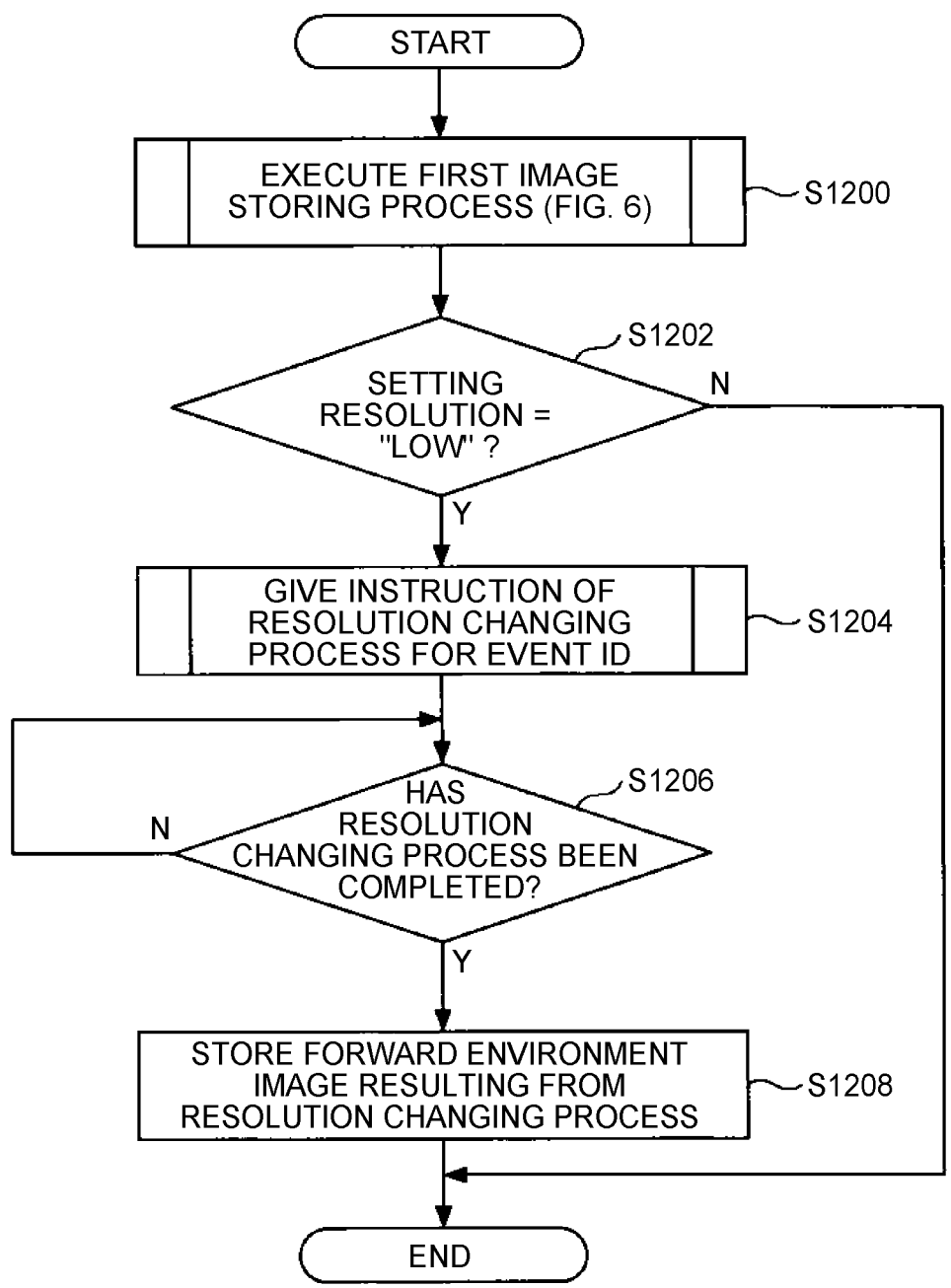
FIG. 12 is a flowchart showing an exemplary image storing process by an image storing processing unit in the embodiment 2.

FIG. 12 is a flowchart showing an exemplary image storing process by the image storing processing unit 724A. For example, the image storing process shown in FIG. 12 is executed in a predetermined cycle, when the ignition switch is in the on-state.

In step S1200, the image storing processing unit 724A executes a first image storing process. The first image storing process is the same as the image storing process (step S600 to step S618) shown in FIG. 6. When the determination result in step S616 is "NO" or when step S618 ends, the process proceeds to step S1202.

In step S1202, the image storing processing unit 724A determines whether the setting resolution set by the user is "LOW". The setting resolution is a setting value that can be changed by the user. If the determination result is "YES", the process proceeds to step S1204. Otherwise, the process proceeds to step S1210.

In step S1204, the image storing processing unit 724A gives the event ID of the detected event to the resolution changing unit 726A, and makes the resolution changing unit 726A execute the resolution changing process. This resolution changing process will be described later with reference to FIG. 13.

In step S1206, the image storing processing unit 724A determines whether the resolution changing process by the resolution changing unit 726A has been completed. If the determination result is "YES", the process proceeds to step S1208. Otherwise, the processing device 7A becomes a waiting state of waiting for the completion of the resolution changing process by the resolution changing unit 726A.

In step S1208, the image storing processing unit 724A stores (overwrites) the forward environment image I resulting from the resolution changing process in step S1206, in the recording area (the recording area of the image storage unit 710) for the event ID of the detected event.

According to the process shown in FIG. 12, when the event occurs, the image storing processing unit 724A can store the forward environment image I resulting from performing the resolution changing process by the resolution changing unit 726A depending on the setting resolution set by the user, in the image storage unit 710.

In the process shown in FIG. 12, whether to perform the resolution changing process is determined depending on the setting resolution set by the user, but the disclosure is limited to this. The image storing processing unit 724A may always make the resolution changing unit 726A execute the resolution changing process. In this case, the setting resolution is unnecessary. Alternatively, the image storing processing unit 724A may determine whether to perform the resolution changing process, based on the current vehicle position or the like.

In the process shown in FIG. 12, the image storing processing unit 724A once stores the forward environment image I for the detected event, in the recording area of the image storage unit 710, and then makes the resolution changing unit 726A execute the resolution changing process, but the disclosure is not limited to this. For example, the image storing processing unit 724A may make the resolution changing unit 726A execute the resolution changing process for the forward environment image I in the recording period T1, which is the forward environment image I of the image data stored in the ring buffer, and store the forward environment image I resulting from the resolution changing process, in the recording area of the image storage unit 710.

Figure 13:
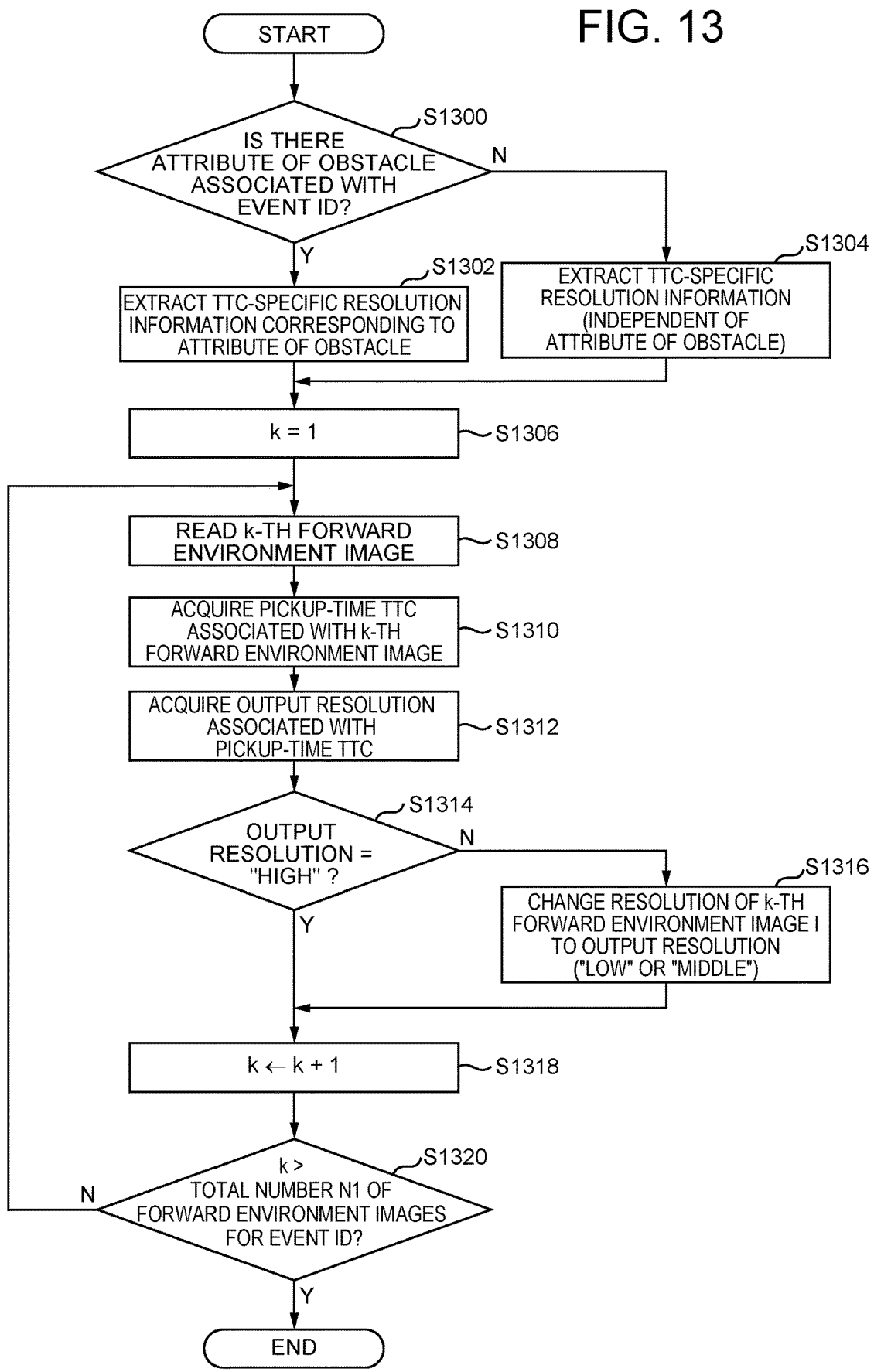
FIG. 13 is a flowchart showing an exemplary resolution changing process in the embodiment 2.

FIG. 13 is a flowchart showing an exemplary resolution changing process by the resolution changing unit 726A. The execution of the resolution changing process shown in FIG. 13 is triggered by the input of the event ID of the detected event in step S1204 of FIG. 12.

In step S1300, the resolution changing unit 726A determines whether the attribute of the obstacle associated with the event ID of the detected event is stored in the image storage unit 710 (see FIG. 3). If the determination result is "YES", the process proceeds to step S1302. Otherwise, the process proceeds to step S1304.

In step S1302, the resolution changing unit 726A extracts the TTC-specific resolution information corresponding to the attribute of the obstacle, based on the obstacle attribute-specific resolution information (FIG. 5) in the obstacle attribute-specific resolution storage unit 714.

In step S1304, the resolution changing unit 726A extracts the TTC-specific resolution information in the TTC-specific resolution storage unit 712.

After step S1302 and step S1304, the process proceeds to step S1306. In step S1306 and the subsequent steps, the TTC-specific resolution information extracted in step S1302 or step S1304 is used. In the description of step S1306 and the subsequent steps, the TTC-specific resolution information extracted in step S1302 or step S1304 is referred to as merely "TTC-specific resolution information".

In step S1306, the resolution changing unit 726A sets k to 1.

In step S1308, the resolution changing unit 726A reads a k-th forward environment image I of a plurality of forward environment images I associated with the event ID of the detected event, from the image storage unit 710. For example, the k-th forward environment image I may be a forward environment image I that is of the plurality of forward environment images I associated with the event ID of the detected event and that is picked up for the k-th time in time series.

In step S1310, the resolution changing unit 726A acquires the pickup-time TTC associated with the k-th forward environment image I, based on the data (see FIG. 3) in the TTC-specific resolution storage unit 712.

In step S1312, the resolution changing unit 726A acquires the output resolution ("LOW", "MIDDLE" or "HIGH") associated with the pickup-time TTC acquired in step S1310, based on the pickup-time TTC acquired in step S1310 and the TTC-specific resolution information (FIG. 4 or FIG. 5).

In step S1314, the resolution changing unit 726A determines whether the output resolution acquired in step S1312 is "HIGH". If the determination result is "YES", the process proceeds to step S1318. Otherwise (that is, if the output resolution is "LOW" or "MIDDLE"), the process proceeds to step S1316.

In step S1316, the resolution changing unit 726A changes (decreases) the resolution of the k-th forward environment image I, to the output resolution acquired in step S1312.

In step S1318, the resolution changing unit 726A increments k by "1".

In step S1320, the resolution changing unit 726A determines whether k is more than a total number N1 of the plurality of forward environment images I associated with the event ID of the detected event. If the determination result is "YES", the process ends with no change. Otherwise, the process is continued from step S1308.

According to the process shown in FIG. 13, the resolution changing unit 726A can change (maintain) the resolution of the forward environment image I depending on the pickup-time TTC, for each forward environment image I, using the TTC-specific resolution information corresponding to the attribute of the obstacle.

Thus, the embodiments have been described in detail. The disclosure is not limited to particular embodiments, and various modifications and alterations can be made within the scope of the claims. Further, it is allowable to combine all or some of the constituent elements in the above-described embodiments.

For example, in the above-described embodiment 1 (or embodiment 2), the pickup-time TTC is used as an example of the index value indicating the possibility of the collision between the vehicle and the obstacle, but the disclosure is not limited to this. For example, it is allowable to use an index value that is derived by the combination of the pickup-time TTC and another parameter. For example, it is allowable to use an index value that is derived by the combination of the pickup-time TTC and the lateral position (the lateral position at the time of the pickup of the forward environment image I) as another parameter. This index value may be higher as the lateral position is smaller (as the lateral difference between the vehicle and the obstacle), and may be higher as the pickup-time TTC is smaller. In this case, index value-specific resolution information associated with the output resolution for each index value is used instead of the TTC-specific resolution information. In the index value-specific resolution information, the index value is associated with the output resolution such that the output resolution is lower as the index value is lower.

Another example of the index value indicating the possibility of the collision between the vehicle and the obstacle may be a value indicating whether the obstacle has been detected in a predetermined area (that is, "TRUE" or "FALSE"). The predetermined area is previously specified as an existence area for the obstacle that can collide with the vehicle. The obstacle in the predetermined area can be detected by the above-described forward radar sensor 83. For example, in the case where the forward radar sensor 83 is a ranging sensor using an ultrasonic wave, the other example of the index value indicating the possibility of the collision between the vehicle and the obstacle is a value indicating whether the obstacle exists. In this case, the predetermined area may correspond to the detection area of the ranging sensor. In this case, the processing device 7 performs the quality changing process for the forward environment image I picked up at the time when the index value is "FALSE" (a value indicating that the obstacle has not been detected in the predetermined area). In the case where the forward radar sensor 83 is a ranging sensor, for example, in the image storing process shown in FIG. 6, the image storing processing unit 724 sets the start time and end time of the recording period T1, in response to an event in which the forward radar sensor 83 has detected the obstacle (see step S604). In this case, any of the period A, the period B and the period C may be used, and the recording period T1 may be set to a period in which the forward radar sensor 83 detects the obstacle.

In the above-described embodiment 1 (or embodiment 2), the forward radar sensor 83 is used. However, a radar sensor or image sensor that monitors the lateral sight and/or rearward sight from the vehicle may be used, instead of or in addition to the forward radar sensor 83. For example, in the case of using a lateral radar sensor that monitors the lateral sight from the vehicle, another example of the value indicating whether the obstacle has been detected in the predetermined area (another example of the index value indicating the possibility of the collision between the vehicle and the obstacle) is a value indicating whether the obstacle has been detected by the lateral radar sensor. In this case, the predetermined area may correspond to the detection area of the lateral radar sensor. In this case, the processing device 7 performs the quality changing process for the forward environment image I picked up at the time when the index value is "FALSE" (a value indicating that the obstacle has not been detected by the forward radar sensor). In the case where the forward radar sensor 83 is the lateral radar sensor, for example, in the image storing process shown in FIG. 6, the image storing processing unit 724 sets the start time and end time of the recording period T1, in response to an event in which the lateral radar sensor has detected the obstacle (see step S604). In this case, any of the period A, the period B and the period C may be used, and the recording period T1 is set to a period in which the lateral radar sensor detects the obstacle.

Another example of the index value indicating the possibility of the collision between the vehicle and the obstacle may be an operation state of an alert control for issuing an alert showing the possibility of the collision between the vehicle and the obstacle. In this case, the index value indicating the possibility of the collision between the vehicle and the obstacle may be a value that is "TRUE" if the alert control for issuing the alert showing the possibility of the collision between the vehicle and the obstacle is in operation, and that is "FALSE" otherwise. For example, the alert control for issuing the alert showing the possibility of the collision between the vehicle and the obstacle may be an alert of a PCS, a CTA (Cross Traffic Alert) or the like. In this case, the processing device 7 performs the quality changing process for the forward environment image I picked up at the time when the index value is "FALSE".

In the above-described embodiment 1 (or embodiment 2), the processing device 7 performs the quality changing process of decreasing the quality of the forward environment image I, based on the index value indicating the possibility of the collision between the vehicle and the obstacle, but the disclosure is not limited to this. For example, the processing device 7 may perform the quality changing process of decreasing the quality of the forward environment image I, using an index value based on a traveling state of the vehicle. For example, the index value based on a traveling state of the vehicle may be an index value about a "stop sign", a "red light", a "driver's sudden steering", a "driver's sudden braking" or the like.

For example, the index value about the "stop sign" may be a value that is "TRUE" if the vehicle is approaching the "stop sign" and that is "FALSE" otherwise. In this case, the processing device 7 performs the quality changing process for the forward environment image I picked up at the time when the index value is "FALSE". The "stop sign" can be recognized by image recognition or the like. Further, it is allowable to use an index value that is "TRUE" if a road-related object such as a sign and a traffic light is detected without being limited to the "stop sign".

Similarly, the index value about the "red light" may be a value that is "TRUE" if the vehicle is approaching the "red light" and the driver is possibly missing the "red light" and that is "FALSE" otherwise. In this case, the processing device 7 performs the quality changing process for the forward environment image I picked up at the time when the index value is "FALSE". The red light can be detected by a state of the traffic light (a state such as red light) acquired through a road-to-vehicle communication system. The possibility of the missing of the red light by the driver may be detected when the driver continues to depress an accelerator pedal even though the vehicle is approaching a "red light" intersection. For example, in the case where an ITS (Intelligent Transport Systems) sends various instructions to the vehicle side, the index value may be a value that becomes "TRUE" or "FALSE" based on instructions from the ITS. Here, the index value may be a value that becomes "TRUE" only when a predetermined condition (for example, red light, yellow light, stop or the like that requires the stop of the vehicle) of the instructions from the ITS is satisfied.

The index value about the "driver's sudden steering" may be a value that is "TRUE" if the vehicle is in a sudden steering state and that is "FALSE" otherwise. In this case, the processing device 7 performs the quality changing process for the forward environment image I picked up at the time when the index value is "FALSE". The sudden steering state can be detected based on a state from a steering sensor.

The index value about the "driver's sudden braking" may be a value that is "TRUE" if the vehicle is in a sudden braking state and that is "FALSE" otherwise. In this case, the processing device 7 performs the quality changing process for the forward environment image I picked up at the time when the index value is "FALSE". The sudden braking state can be detected based on a state from a brake sensor.

In addition, the index value based on the traveling state of the vehicle may be a value that is "TRUE" if an intervention control is operating and that is "FALSE" otherwise. The intervention control includes VSC (Vehicle Stability Control), ABS (Antilock Brake System), TRC (TRaction Control), LKA (Lane Keeping Assist) and the like. In this case, the processing device 7 performs the quality changing process for the forward environment image I picked up at the time when the index value is "FALSE".

What is claimed is:

1. An image recording system comprising:
a memory in which an image picked up by a camera and an index value are stored in association with each other, the camera being equipped in a vehicle, the index value indicating a possibility of collision between the vehicle and an obstacle at a time when the image is picked up; and
at least one processing circuit configured to perform a quality changing process of decreasing a quality of the image, based on the index value, wherein
the image includes frame images that are a plurality of images picked up at different time points from each other, and
the at least one processing circuit is configured to perform the quality changing process such that a frame image picked up at a second time point is lower in quality than a frame image picked up at a first time point, the first time point being a time point when the possibility of the collision indicated by the index value is high, the second time point being a time point when the possibility of the collision indicated by the index value is low.

2. The image recording system according to claim 1, wherein
the index value is a time until the vehicle collides with the obstacle, and
the at least one processing circuit is configured to perform the quality changing process such that a frame image picked up at the second time point is lower in quality than a frame image picked up at the first time point, the time until the vehicle collides with the obstacle being longer at the second time point than at the first time point.

3. The image recording system according to claim 1, wherein
the index value is a value indicating whether the obstacle has been detected in a predetermined area, and
the at least one processing circuit is configured to perform the quality changing process such that a frame image picked up at the second time point is lower in quality than a frame image picked up at the first time point, the first time point being a time point when the obstacle has been detected in the predetermined area, the second time point being a time point when the obstacle has not been detected in the predetermined area.

4. The image recording system according to claim 1, wherein
the image is stored in the memory, in association with a recognition result of an attribute of the obstacle, and
the at least one processing circuit is configured to perform the quality changing process, further based on the recognition result.

5. The image recording system according to claim 1, wherein
the at least one processing circuit is configured to perform the quality changing process at a time before the image is stored in the memory, or at a time after the image is stored in the memory and before the image is read from the memory in response to an output request from an exterior device, the output request being a request of output of the image to an external device or a display device.

6. The image recording system according to claim 1, wherein
the at least one processing circuit is configured to perform the quality changing process at a time when the image is read from the memory in response to an output request from an exterior device, the output request being a request of output of the image to an external device or an display device.

7. The image recording system according to claim 1, wherein
the quality changing process of decreasing the quality of the image includes at least one of decreasing a resolution of the image and decreasing a color number of the image.

8. An image recording method executed by a computer, comprising:
(a) storing an image picked up by a camera and an index value in a memory in association with each other, the camera being equipped in a vehicle, the index value indicating a possibility of collision between the vehicle and an obstacle at a time when the image is picked up; and
(b) decreasing a quality of the image based on the index value, the quality of the image being a quality at a time when the image is output to an external device or a display device, wherein
the image includes frame images that are a plurality of images picked up at different time points from each other, and
step (b) includes decreasing a quality of a frame image picked up at a second time point such that the frame image picked up at the second time point is lower in quality than a frame image picked up at a first time point, the first time point being a time point when the possibility of the collision indicated by the index value is high, the second time point being a time point when the possibility of the collision indicated by the index value is low.

9. The image recording method according to claim 8, wherein
the index value is a time until the vehicle collides with the obstacle, and
step (b) includes decreasing the quality of a frame image picked up at the second time point such that the frame image picked up at the second time point is lower in quality than a frame image picked up at the first time point, the time until the vehicle collides with the obstacle being longer at the second time point than at the first time point.

10. The image recording method according to claim 8, wherein
the index value is a value indicating whether the obstacle has been detected in a predetermined area, and
step (b) includes decreasing the quality of a frame image picked up at the second time point such that the frame image picked up at the second time point is lower in quality than a frame image picked up at the first time point, the first time point being a time point when the obstacle has been detected, the second time point being a time point when the obstacle has not been detected.

11. The image recording method according to claim 8, wherein
step (a) includes storing the image in association with a recognition result of an attribute of the obstacle, and
step (b) includes decreasing the quality of the image, further based on the recognition result.

12. The image recording method according to claim 8, wherein
step (b) is executed at a time before the image is stored in the memory, or at a time after the image is stored in the memory and before the image is read from the memory in response to an output request from an exterior device, the output request being a request of output of the image to the external device or the display device.

13. The image recording method according to claim 8, wherein
step (b) is executed at a time when the image is read from the memory in response to an output request from an exterior device, the output request being a request of output of the image to the external device or the display device.

14. The image recording method according to claim 8, wherein
step (b) includes at least one of decreasing a resolution of the image and decreasing a color number of the image.

15. A non-transitory storage medium recording an image recording program executed by a computer, when the image recording program is executed by the computer, the image recording program cause the computer to perform a method comprising:
storing an image picked up by a camera and an index value in a memory in association with each other, the camera being equipped in a vehicle, the index value indicating a possibility of collision between the vehicle and an obstacle at a time when the image is picked up; and
decreasing a quality of the image based on the index value, the quality of the image being a quality at a time when the image is output to an external device or a display device, wherein
the image includes frame images that are a plurality of images picked up at different time points from each other, and
a quality of a frame image picked up at a second time point is decreased such that the frame image picked up at the second time point is lower in quality than a frame image picked up at a first time point, the first time point being a time point when the possibility of the collision indicated by the index value is high, the second time point being a time point when the possibility of the collision indicated by the index value is low.

* * * * *